(12) United States Patent
Mosca et al.

(10) Patent No.: US 12,042,969 B2
(45) Date of Patent: Jul. 23, 2024

(54) APPARATUS FOR THE MANUFACTURE AND UNLOADING OF PREFORMS FOR THE MANUFACTURE OF PLASTIC CONTAINERS

(71) Applicant: SACMI IMOLA S.C., Imola (IT)

(72) Inventors: Rossano Mosca, Caerano di San Marco (IT); Manuel Giorgi, Casola Valsenio (IT)

(73) Assignee: SACMI IMOLA S.C., Imola (IT)

( * ) Notice: Subject to any disclaimer, the term of this patent is extended or adjusted under 35 U.S.C. 154(b) by 105 days.

(21) Appl. No.: 17/938,479

(22) Filed: Oct. 6, 2022

(65) Prior Publication Data

US 2023/0124802 A1    Apr. 20, 2023

(30) Foreign Application Priority Data

Oct. 19, 2021   (IT) .................. 102021000026723

(51) Int. Cl.
| | |
|---|---|
| *B29C 45/72* | (2006.01) |
| *B29C 45/17* | (2006.01) |
| *B29C 45/76* | (2006.01) |
| *B29C 49/64* | (2006.01) |

(52) U.S. Cl.
CPC ...... *B29C 45/7207* (2013.01); *B29C 45/1769* (2013.01); *B29C 45/7686* (2013.01); *B29C 49/6427* (2013.01); *B29C 2045/7214* (2013.01); *B29C 2945/7604* (2013.01); *B29C 2945/76153* (2013.01); *B29C 2945/76163* (2013.01); *B29C 2945/76464* (2013.01)

(58) Field of Classification Search
CPC ............ B29C 49/6427; B29C 45/7686; B29C 2945/7604; B29C 2945/76153; B29C 2945/76163; B29C 2945/76464; B29C 2045/7214

See application file for complete search history.

(56) References Cited

FOREIGN PATENT DOCUMENTS

| | | |
|---|---|---|
| GB | 2528934 A | 2/2016 |
| WO | 2005037521 A1 | 4/2005 |
| WO | 2016008928 A1 | 1/2016 |
| WO | 2018036857 A1 | 3/2018 |
| WO | WO-2018072009 A1 * | 4/2018 |
| WO | 2021160474 A1 | 8/2021 |

OTHER PUBLICATIONS

IT Search Report issued May 12, 2022 re: Application No. IT 202100026723; pp. 1-7; citing: WO2021/160474 A1, WO 2005/037521 A1, GB 2 528 934 A, WO 2018/036857 A1 and WO 2016/008928 A1.

European Office Action for European Application No. 22196905.8, dated Mar. 21, 2023, 5 pages.

* cited by examiner

*Primary Examiner* — Robert B Davis
(74) *Attorney, Agent, or Firm* — CANTOR COLBURN LLP (57) ABSTRACT

An apparatus for the manufacture and unloading of preforms for the manufacture of plastic containers includes a device for the injection molding of preforms and a device for the cooling and extraction of the preforms from the molding device, and further includes a device for the selective extraction of a predetermined subset of preforms supported by the unloading plate in an orderly manner along at least one pickup direction. The apparatus also includes a component for the orderly transfer of the predetermined subset of preforms to a control and inspection device adapted to perform at least one control on the predetermined subset of preforms.

13 Claims, 12 Drawing Sheets

APPARATUS FOR THE MANUFACTURE AND UNLOADING OF PREFORMS FOR THE MANUFACTURE OF PLASTIC CONTAINERS

CROSS-REFERENCE TO RELATED APPLICATIONS

This application is related to and claims priority to Italian Patent Application No. 102021000026723, filed on Oct. 19, 2021, the contents of which are hereby incorporated by reference in its entirety.

TECHNICAL FIELD

The present disclosure relates to an apparatus for the manufacture and unloading of preforms for the manufacture of plastic containers.

BACKGROUND

Apparatuses are known which are constituted by a device for the manufacture, by molding, of preforms made of plastic material and by devices for unloading and storing the manufactured preforms.

The unloading devices are normally constituted by a cooling plate which forms a plurality of receptacles arranged in a matrix and designed to accommodate respective still-warm preforms for the time required to at least partially cool them.

Typically, these preforms are fed directly from the press, typically of the injection type, to the cooling plate and remain in the respective receptacle for a predetermined time.

Specifically, once the injection molding process has ended, the mold opens and the cooling plate is moved towards the preforms partially accommodated in one of the two mold parts, so that the receptacles can engage respective portions of preforms that emerge from the mold part in order to extract them from it, so as to allow the closure of the mold and a new molding cycle.

A device for cooling and extracting preforms for the manufacture of plastic containers is known from international application PCT/EP2021/052440 in the name of this same Applicant which comprises at least one grip assembly which forms a plurality of receptacles for respective preforms and means for transferring the still-warm preforms from an injection molding device to said grip assembly; the device comprises a cooling and extraction assembly which comprises a cooling plate which is arranged so as to face said grip assembly and can move on command between a position that is closer to the grip assembly and a position that is spaced from the grip assembly. The cooling plate supports a plurality of cooling channels which are designed, with the cooling plate in the closer position, to lead into a respective preform which is accommodated in a respective receptacle in order to convey a jet of air into the preform so as to increase its cooling rate. The cooling and extraction assembly comprises an unloading plate, which is arranged on the opposite side of the grip assembly with respect to the cooling plate and supports a plurality of grip bodies which can be moved on command in order to cross the cooling plate so as to engage selectively, with the cooling plate in the closer position, with a respective preform to allow its extraction from the respective receptacle.

Devices for controlling the quality of molded preforms are also known.

A first method for performing preform quality control is the use of devices for quality control of the molded preforms constituted by a quality control unit which is arranged in line downstream of the press and is configured to control all the preforms that are manufactured, performing all the necessary controls and optionally rejecting nonconforming preforms.

If nonconforming preforms are detected, this is reported on the display of the unit and they are optionally rejected. An orientation device is arranged between the press and the control unit, receives the non-oriented preforms from an unloading belt of the press and orients them in order to send them to the quality control unit. The order is random and therefore the unit must be provided with a video camera dedicated to reading the cavity number in order to identify from which mold cavity each controlled preform originates.

A second method for performing preform quality control provides for the use of a unit that is arranged not in line with the press. In this case, an operator picks up, for example, at least one molding from the press and transfers it into the quality control unit, which performs the necessary controls, including weight control. In this case also, the unit must be provided with a video camera dedicated to reading the cavity number, in order to identify from which cavity of the mold each preform originates.

A final method that is used provides for performing a so-called partial statistical control. In particular, solutions have been developed which provide for the installation of video cameras in order to be able to perform some controls directly at the cooling plate (for example to control the color of the preforms) or on the preform evacuation belt. With this control method, however, it is possible to identify only some defects and only on some preforms which are not overlapping or oriented so as to allow the video cameras to acquire an effective image.

Although the solutions described above are widely used, they have some drawbacks.

In the first two cases it is necessary to provide an orientation device, i.e., an additional machine, which introduces costs, higher consumptions, possibilities of machine downtimes but most of all risks of damage to the preforms due to the mechanical orientation systems.

In these cases, powders and/or residues of plastic which can contaminate the product may also be generated.

Furthermore, in all the described solutions it is necessary to provide a dedicated video camera for reading the cavity number of the controlled preforms.

Known solutions, furthermore, are difficult to integrate with the device for the manufacture by molding of preforms made of plastic material and with the unloading and storage devices: in practice, each device, comprising the quality control device, is functionally connected to a computer, to an electrical panel, to a control system, etc., producing a redundancy of components which could be optimized.

If statistical control is performed inline, the hourly productivity of the apparatus must be aligned as regards the manufacturing device (press) and the quality control device, and in order to ensure the operation of the apparatus as a whole it is necessary to provide a bypass system that is capable of intervening in case of problems at the quality control device.

If control is performed offline, the intervention of an operator who goes to feed the control machine is necessary if one wishes to perform quality control of a molding.

In this case, furthermore, it is not possible to use any information obtained as a consequence of the controls performed in order to feedback or adjust the process parameters, since there is a time delay, which moreover is not constant, between the event and its detection.

With reference to the solutions that perform partial statistical controls, it is noted that they analyze a very small sample of preforms at each molding, furthermore providing general information which is not precise since it is not always possible to read the cavity number and consequently locate the defect.

Furthermore, since there is no certainty that a preform produced by the cavity on which intervention was performed in order to try to solve the problem detected earlier will be analyzed in subsequent cycles, it is not possible to verify whether any problem that has emerged has been solved or not.

SUMMARY

The aim of the present disclosure is to provide an apparatus for the manufacture and unloading of preforms for the manufacture of plastic containers that is capable of improving the background art in one or more of the aspects indicated above.

Within this aim, the disclosure provides an apparatus for the manufacture and unloading of preforms for the manufacture of plastic containers that allows to minimize the handling of the preforms to be controlled.

the disclosure also provides an apparatus for the manufacture and unloading of preforms for the manufacture of plastic containers that allows to reduce the number of units currently used, eliminating for example the need to use video cameras to detect the cavity number or the feeding and orientation devices, with consequent savings from the economic standpoint and in terms of space occupation, at the same time avoiding the generation of dust.

the disclosure further provides an apparatus for the manufacture and unloading of preforms for the manufacture of plastic containers that is highly reliable, relatively easy to provide and at competitive costs.

This aim, as well as these and other advantages which will become better apparent hereinafter, are achieved by providing an apparatus for the manufacture and unloading of preforms for the manufacture of plastic containers according to claim 1, optionally provided with one or more of the characteristics of the dependent claims.

BRIEF DESCRIPTION OF THE DRAWINGS

Further characteristics and advantages of the disclosure will become better apparent from the description of some preferred but not exclusive embodiments of the apparatus for the manufacture and unloading of preforms for the manufacture of plastic containers according to the disclosure, illustrated by way of non-limiting example in the accompanying drawings, wherein.

DETAILED DESCRIPTION OF THE DRAWINGS

With reference to the figures, the apparatus for the manufacture and unloading of preforms for the manufacture of plastic containers according to the disclosure, designated generally by the reference numeral 1, comprises a device 2 for molding (by injection) a plurality of preforms 10 and a device 3 for cooling and extracting the preforms 10 from the molding device.

The cooling and extraction device 3 comprises a grip assembly 4 which forms a plurality of cooling receptacles for respective preforms 10, and means for the transfer of the still-warm preforms from the molding device 2 to the grip assembly 4.

The cooling and extraction device 3 further comprises an unloading plate 20, which supports a plurality of grip bodies 21 which are arranged in a matrix and can be moved on command in order to engage selectively the grip assembly 4 to allow the extraction of the cooled preforms 10 from the respective receptacle and the unloading onto an unloading surface 22 of the preforms 10.

According to the present disclosure, the apparatus 1 comprises a device 30 for the selective extraction of a predetermined subset 31 of preforms 10 supported by the unloading plate 20 in an orderly manner along at least one pickup direction 201, and means for the orderly transfer of the predetermined subset 31 of preforms 10 to at least one control and inspection device 40 adapted to perform at least one control on the predetermined subset 31 of preforms 10.

The unloading plate 20 supports a plurality of grip bodies 21 which are arranged in a matrix and are arranged along a plurality of rows 22a and a plurality of columns 22b which are substantially perpendicular to the plurality of rows 22a.

The predetermined subset 31 of preforms 10 supported by the unloading plate 20 corresponds to the preforms 10 supported by at least one row 22a of the grip bodies 21, or to at least one column 22b of the grip bodies 21.

Advantageously, the selective extraction device 30 comprises an elongated body 32 which forms means for supporting the preforms to be extracted.

The selective extraction device 30 is configured to pick up selectively the preforms 10 supported by different rows 22a of the grip bodies and/or by different columns 22b of the grip bodies.

Figure 1:
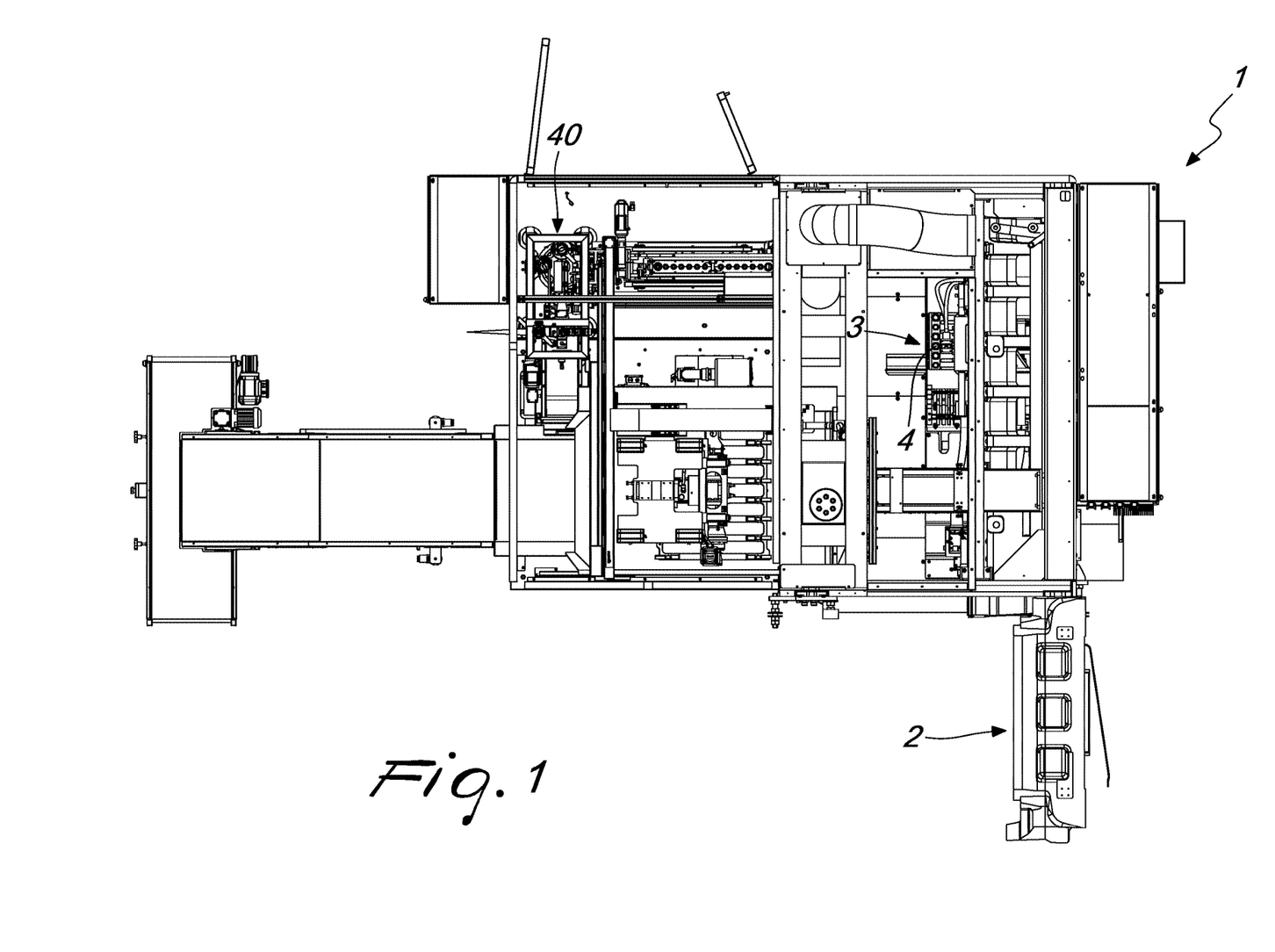
FIG. 1 is a top view of the apparatus for the manufacture and unloading of preforms according to the disclosure.
Figure 2:
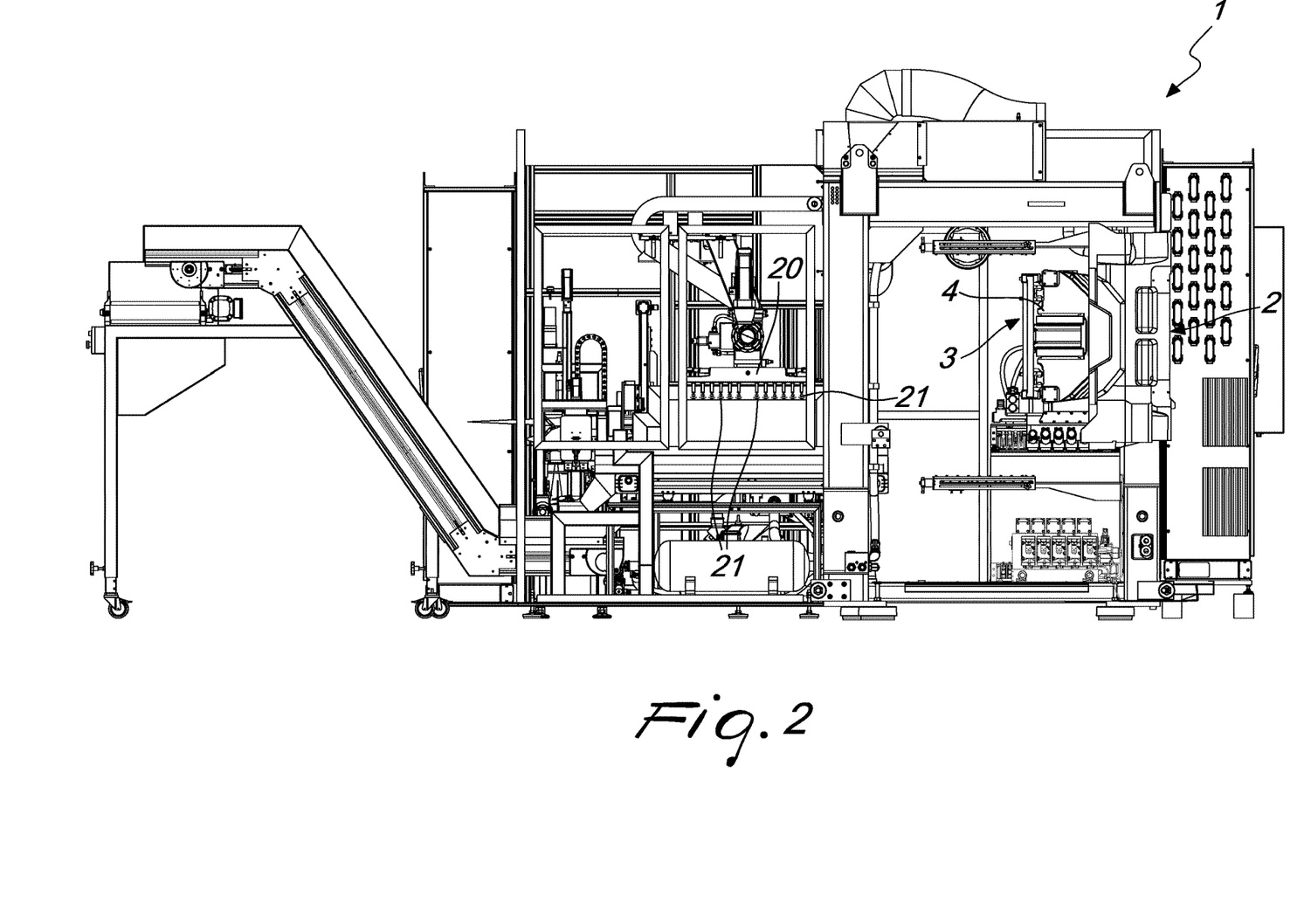
FIG. 2 is a side view of the apparatus of FIG. 1.
Figure 3:
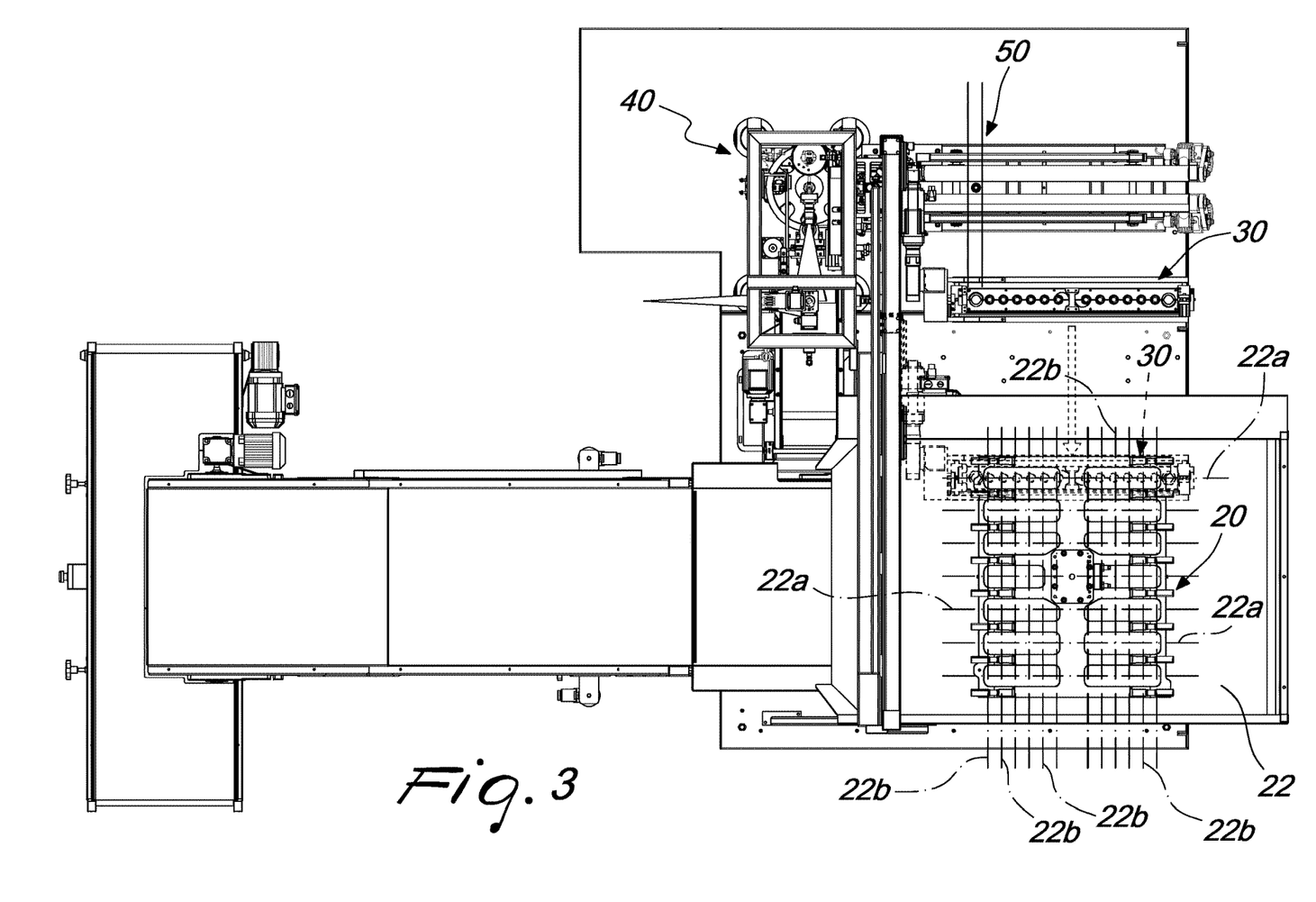
FIG. 3 is an enlarged-scale top view of a portion of the cooling and extraction device, in which the selective extraction device is shown in dashed lines in the pickup position and in solid lines proximate to the conveyance position.
Figure 4:
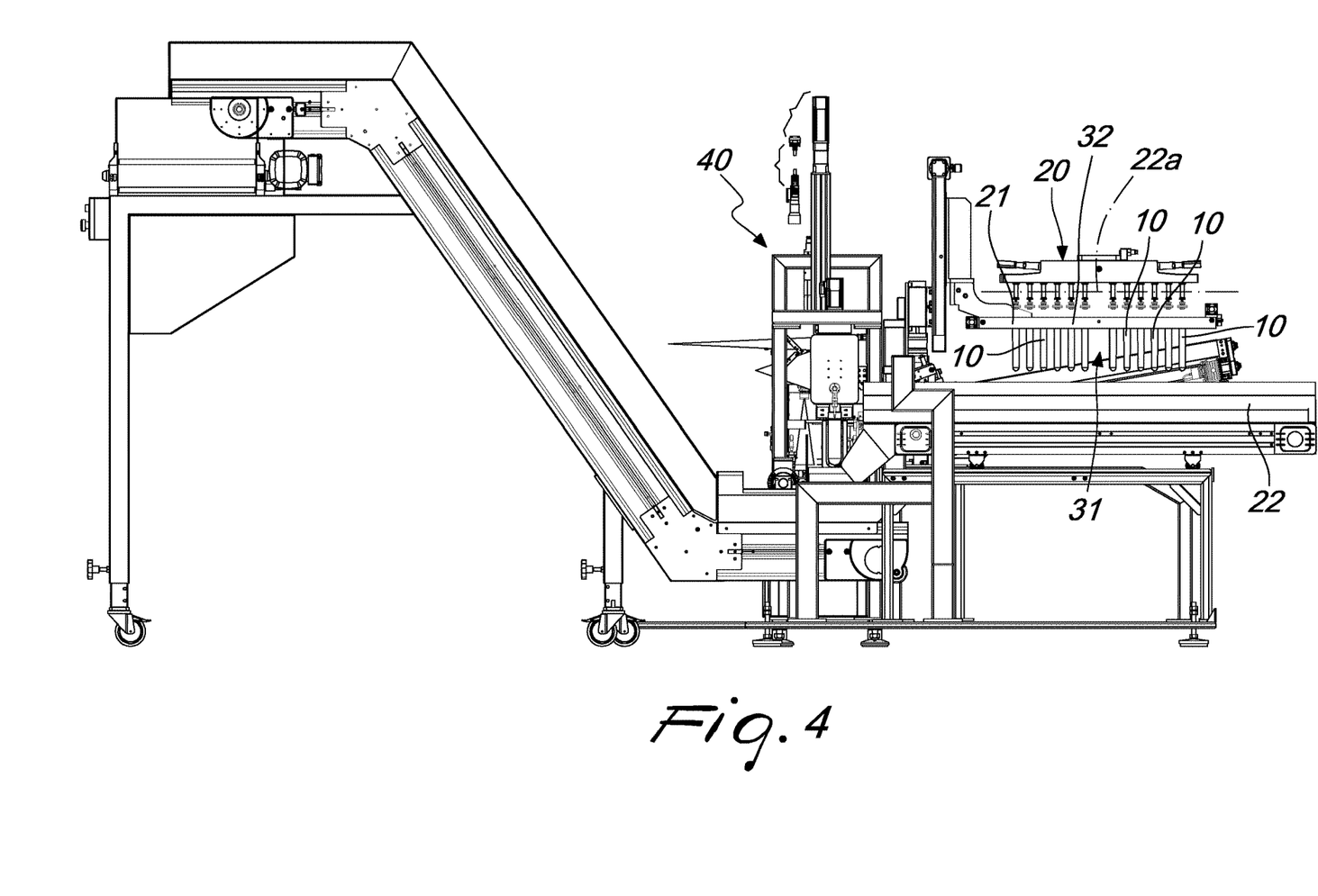
FIG. 4 is a side view of the portion shown in FIG. 3.
Figure 5:
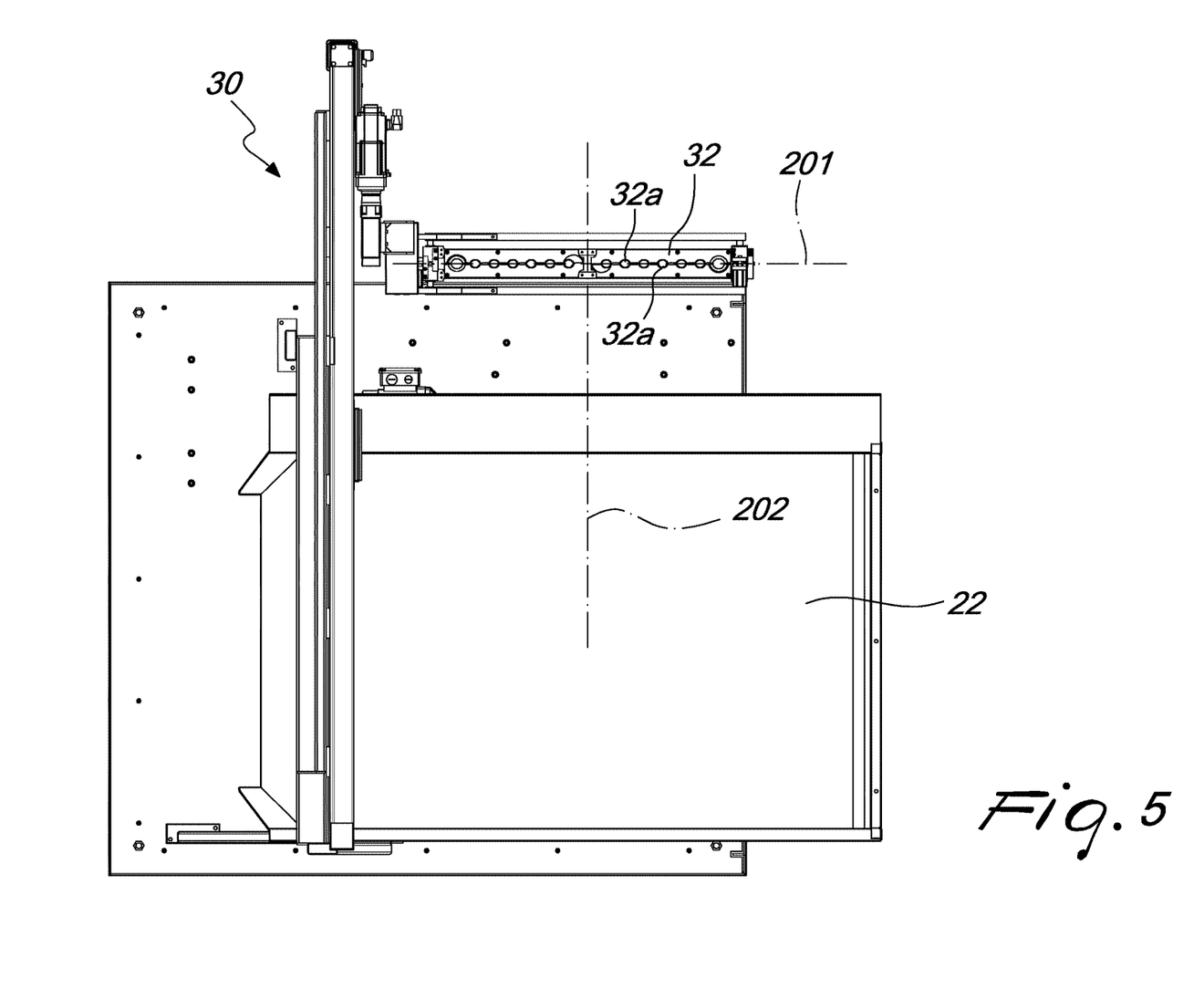
FIG. 5 is a top view of the selective extraction device.
Figure 6:
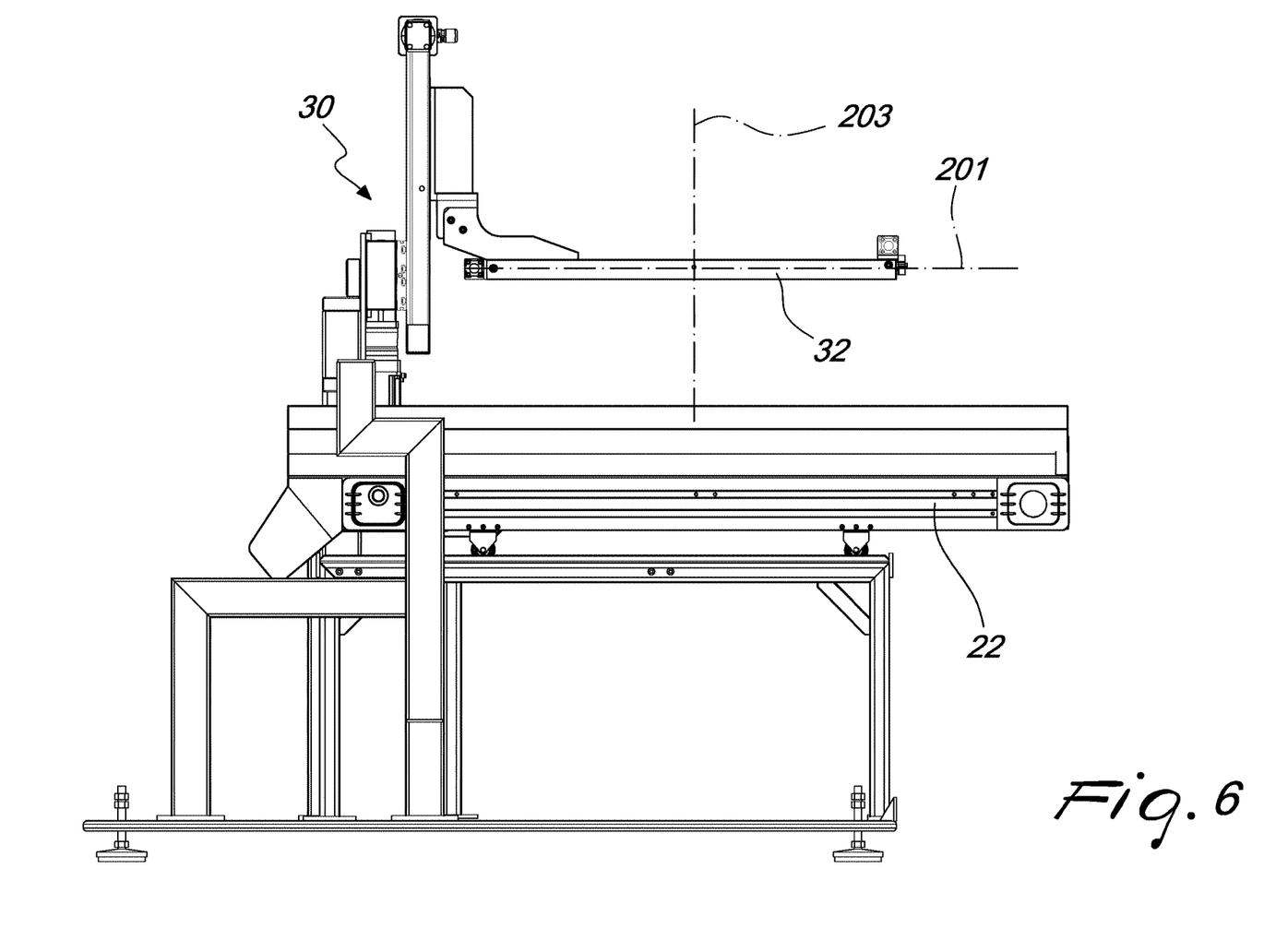
FIG. 6 is a side view of the selective extraction device of FIG. 5.
Figure 7:
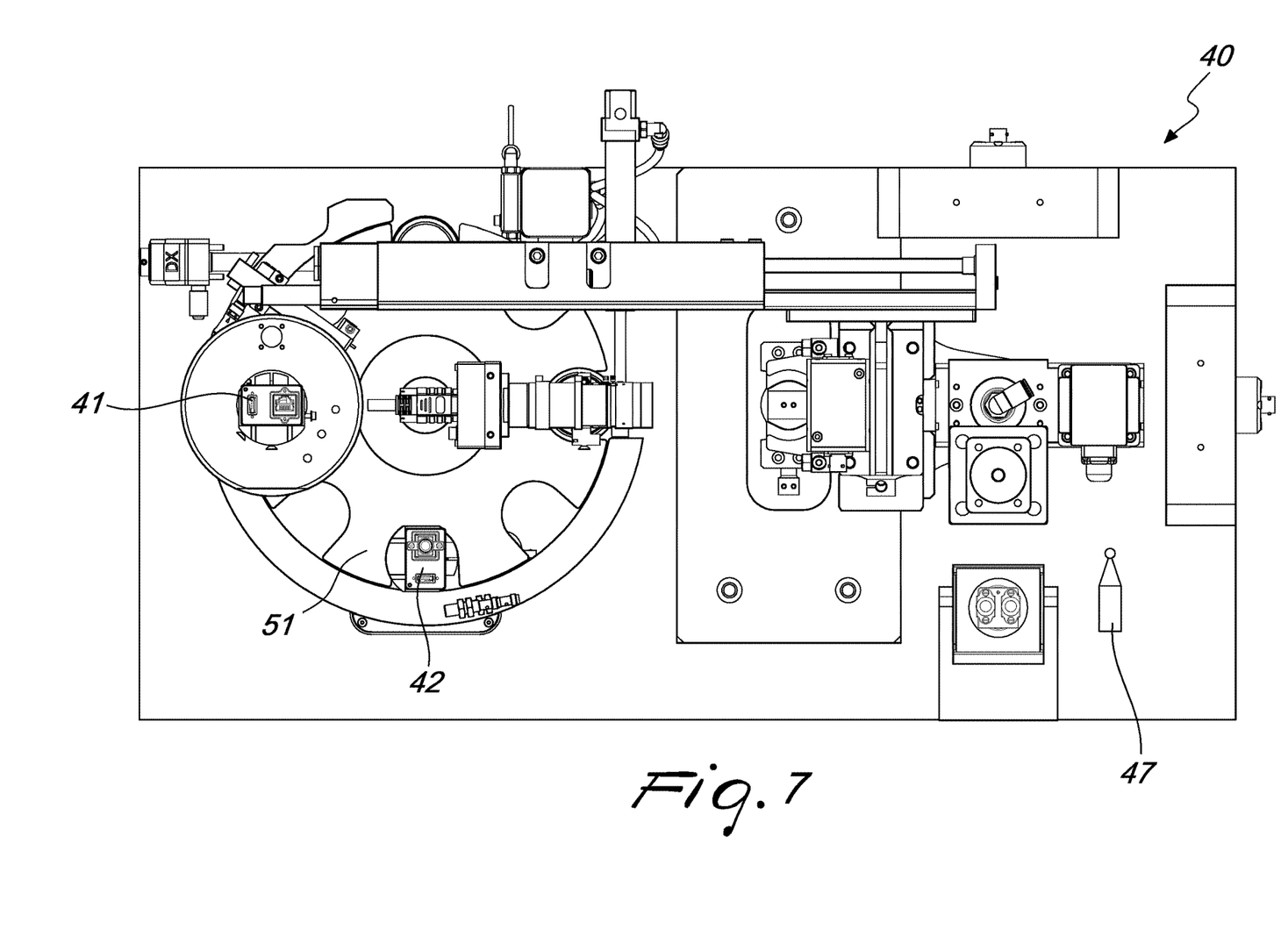
FIG. 7 is a top view of the control and inspection device in a first condition.
Figure 8:
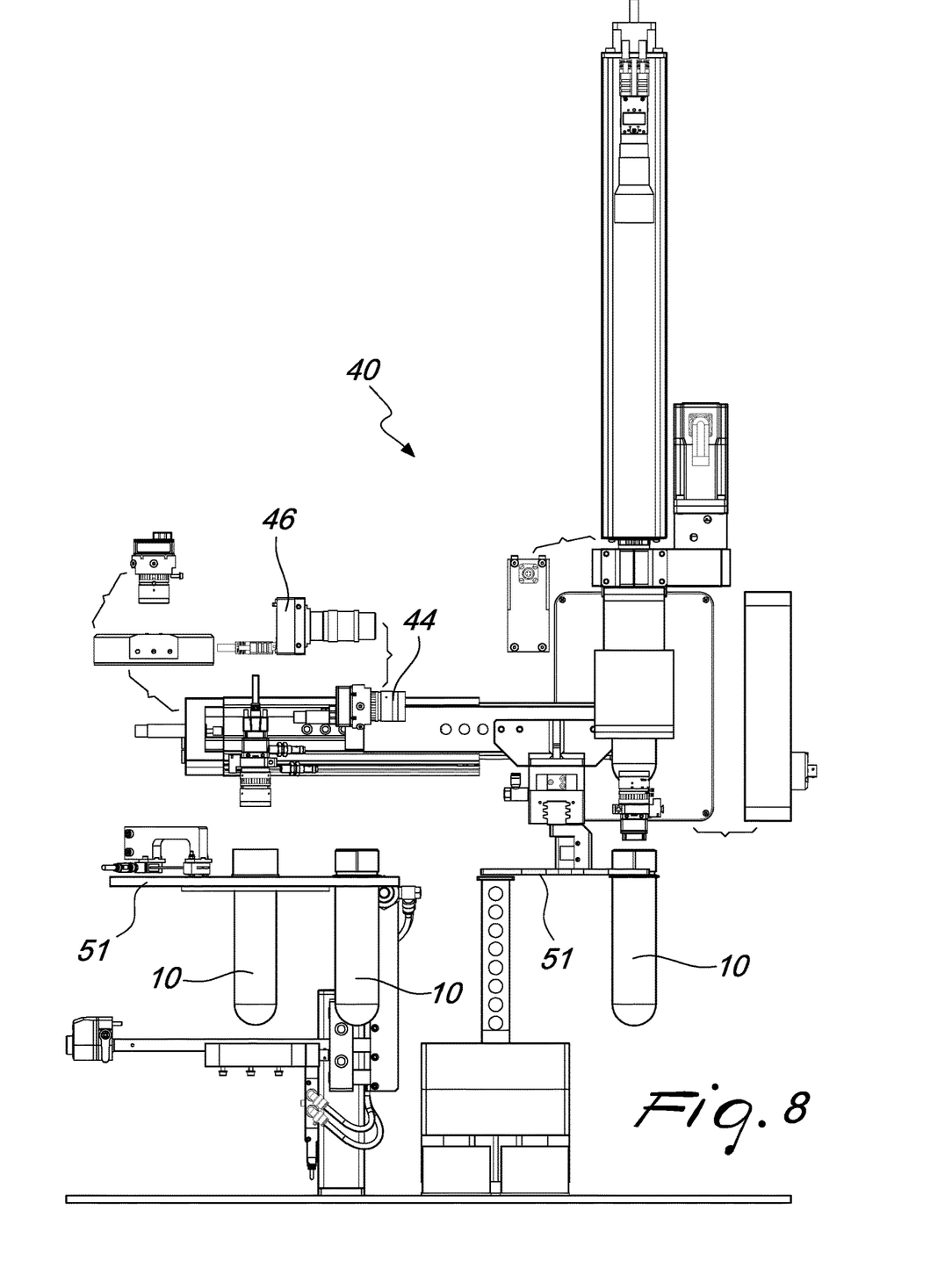
FIG. 8 is a front view of the control and inspection device in the condition shown in FIG. 7.
Figure 9:
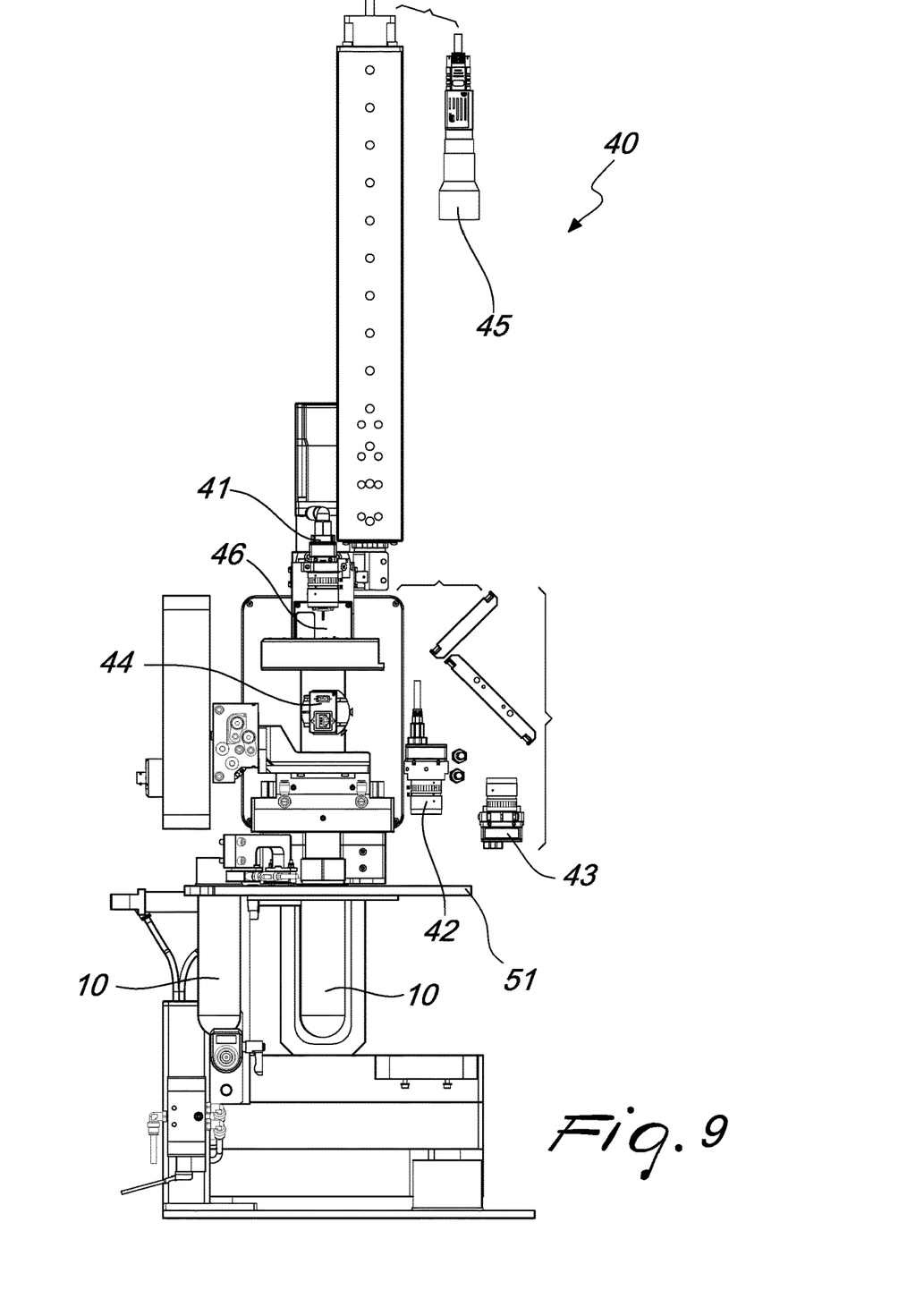
FIG. 9 is a side view of the control and inspection device in the condition shown in FIGS. 7 and 8.
Figure 10:
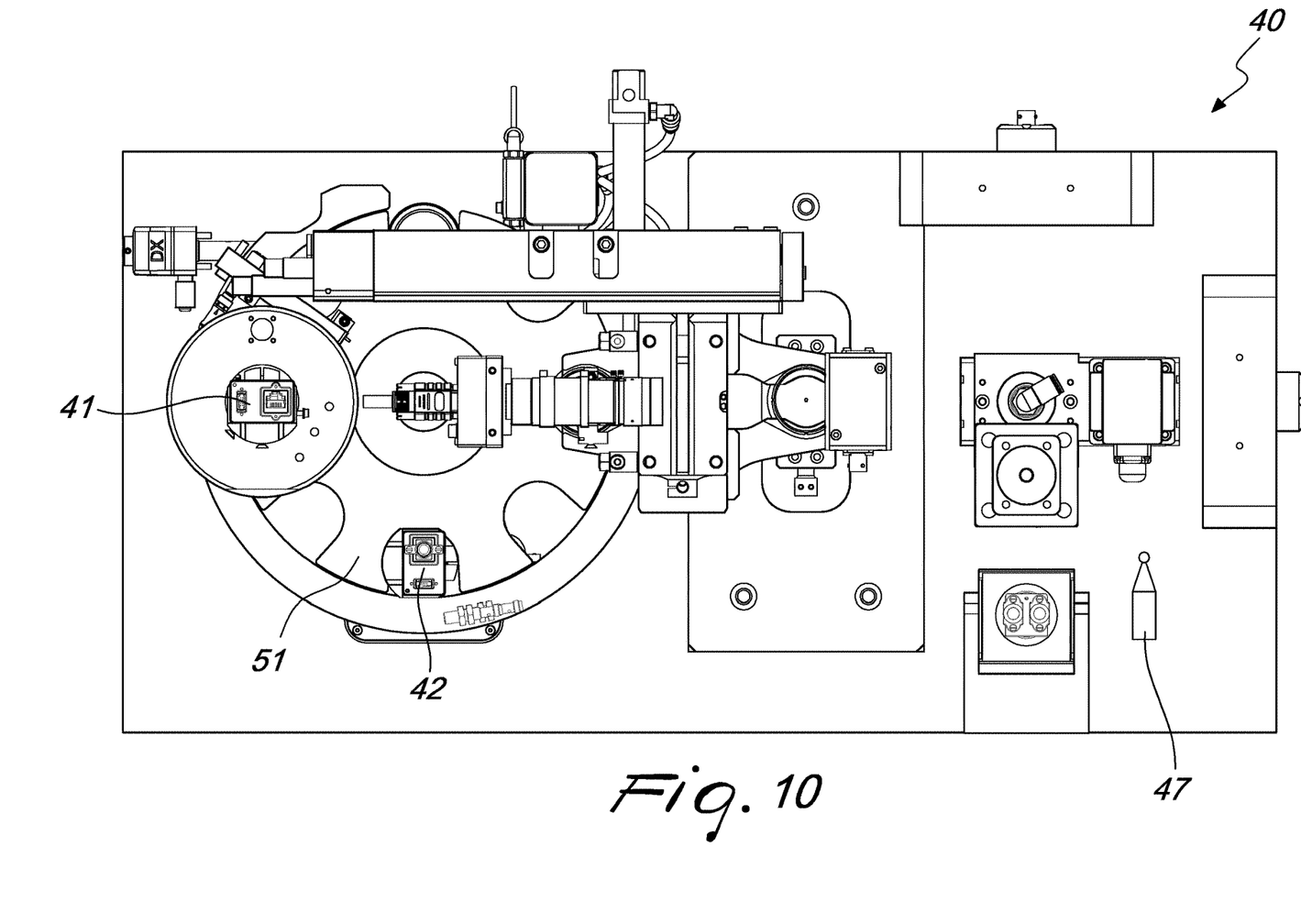
FIG. 10 is a top view of the control and inspection device in a second condition.
Figure 11:
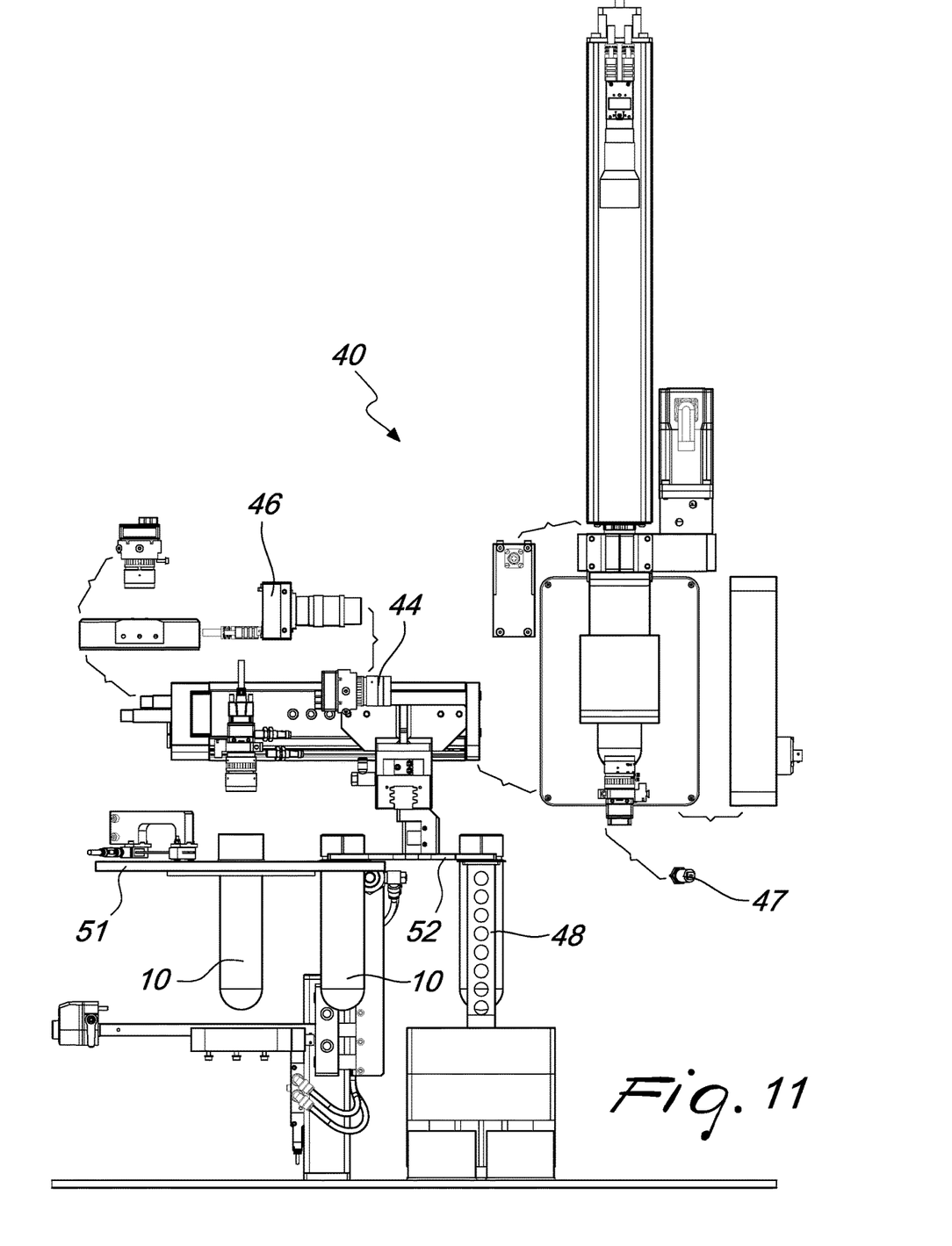
FIG. 11 is a front view of the control and inspection device in the condition shown in FIG. 10.
Figure 12:
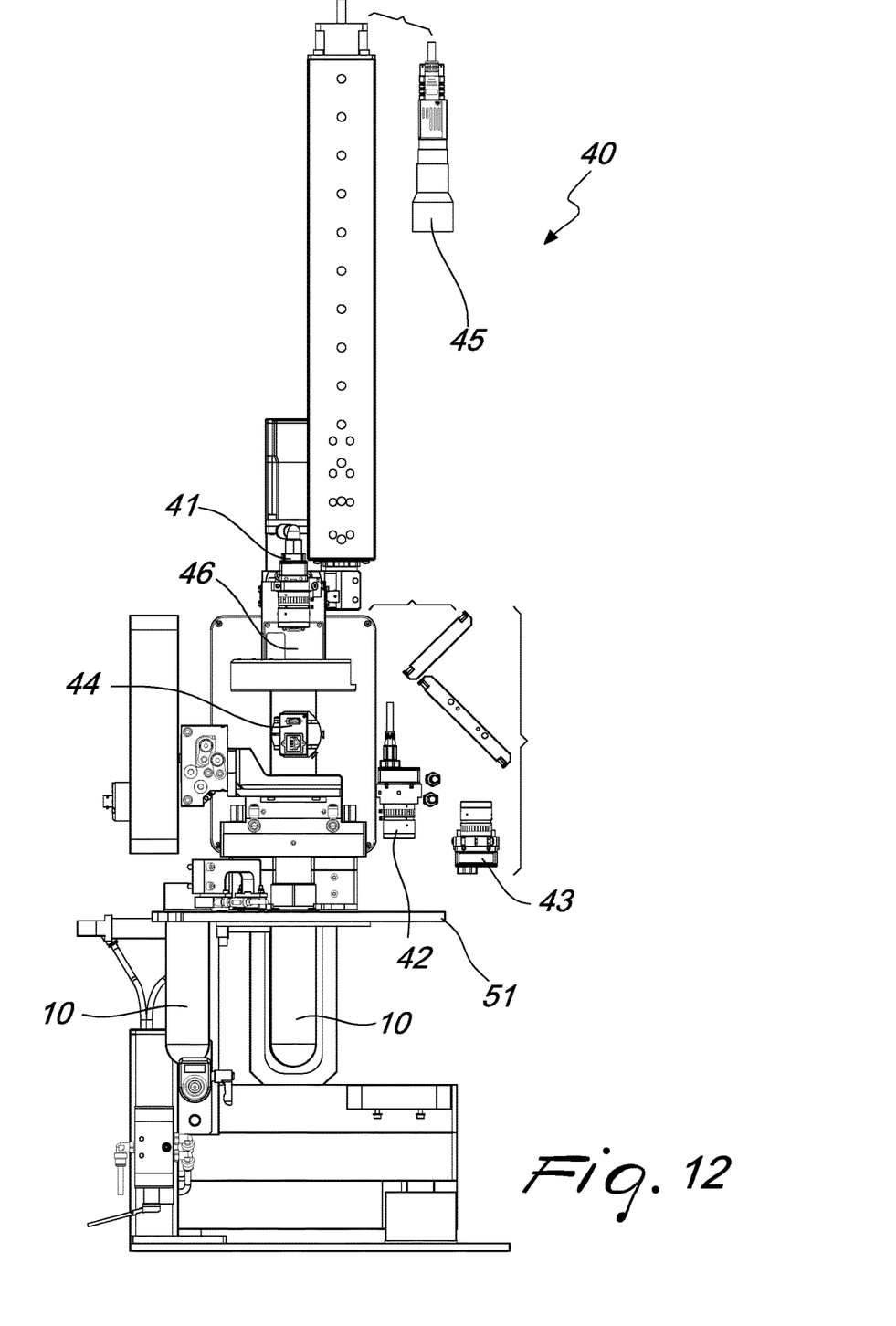
FIG. 12 is a side view of the control and inspection device in the condition shown in FIGS. 10 and 11.

Conveniently, the control and inspection device 40 is associated functionally with means for the movement of the elongated body 32, which are adapted to move the elongated body 32 between a pickup position (shown in broken lines and in phantom lines in FIG. 3), in which it is arranged proximate to the unloading plate 20 and faces respectively at least one respective row 22a and/or a respective column 22b, and a position for conveyance substantially at an unloading region which is arranged proximate to a conveyor 50 adapted to send the preforms 10 in an orderly manner at the control and inspection device 40.

The means for the movement of the elongated body 32 comprise, for example, linear guides associated with respective actuators in order to allow their movement along a movement direction 202, at least from the pickup position to the conveyance position, and optionally also along a direction 203 which is substantially vertical, so as to be able to program the optimum movement trajectory.

With reference to the practical embodiment shown in the figures, the movement direction can be extended substantially at right angles to the pickup direction 201.

The elongated body 32 conveniently comprises a clamp structure to retain, at its mutually facing longitudinal edges 32a, the preforms 10.

Conveniently, the control and inspection device 40 comprises at least one unit chosen from the group comprising:
- a top seal inspection unit with video camera 41;
- a bottom inspection unit with video camera 42;
- a body defect inspection unit with video camera 43;
- a PET body stress inspection unit with video camera 44 using polarized light or a grid;
- a thread parting line inspection unit with video camera 45;
- a thread and bottle neck defect inspection unit with video camera 46;
- a preform color inspection unit with video camera 43;
- a unit for detecting the cavity number 46;
- a unit for the measurement of the body and the thread with video camera 46, including thickness;
- a unit for measuring the temperature with a pyrometer 47;
- a weight control unit 48.

The control and inspection device 40 further comprises at least one unit chosen in the group comprising:
- a unit for measuring thickness with optical sensors;
- a unit for color control with a spectrometer;
- a unit for 3D reconstruction by tomography;
- a unit for acetaldehyde detection by means of an olfactory sensor.

The conveyor 50 is chosen, for example, from the group comprising:
- a belt or chain conveyor;
- an air jet conveyor;
- a pair of oppositely rotating rollers.

The apparatus 1 comprises, downstream of the conveyor 50, an accumulation system.

A timing system may further be provided downstream of said accumulation system.

The operation of the apparatus 1 according to the disclosure is as follows.

The selective extraction device 30 and the control and inspection device 40 can be arranged within the space occupations of the molding, cooling and extraction device.

The plastic is injected by means of an extruder into the molding device and is pressed.

The grip assembly 4 extracts the preforms from the molding device 2 and, by virtue of known solutions, controls the cooling of the preforms 10.

The unloading plate 20 picks up the preforms 10 from the grip assembly 4 with the task of moving them onto the unloading surface 22 constituted by the press extraction belt. The preforms 10 are released by the unloading plate 20 and are conveyed towards the outlet by means of the extraction belt and the extraction belt feeds them into octabins.

The selective extraction device 30 comprises for example the elongated body 32, which can move along the movement direction 202, in order to convey the extracted preforms 10 to the control and inspection device 40.

The elongated body 32 may furthermore be moved along the substantially vertical direction 203 in order to go to pick up and accommodate the preform 10 from the unloading plate 20 in a controlled manner and to release them, again in a controlled manner, to the conveyor 50.

Nothing prevents the possibility to move the elongated body 32 along a different movement trajectory, constituted for example by the combination of the movement along the direction 202 and along the direction 203.

The elongated body 32 intervenes by picking up the preforms directly from the unloading plate 20, where they are arranged, as explained, in a matrix which duplicates the matrix of the mold.

The disclosure, by virtue of the possibility to move the elongated body 32 in the vicinity of the unloading plate 20, allows to pick up the preforms 10 without the risk of causing defects to them during the transfer step.

The elongated body 32 picks up a column 22b and/or a row 22a and/or the entire matrix. Pickup occurs at each molding or at specific time intervals. If the system picks up a single column 22b or a single row 22a, it can perform this operation by deciding each time which of the i-th rows 22a or j-th columns 22b to pick up.

It is therefore evident that it is possible to reconstruct the entire matrix of the mold or concentrate the pickups in a predetermined time and therefore the controls on a single row 22a or column 22b of the matrix, discriminated as potentially critical for any reason, by means of a trigger which can be reported by the automation system or by the control system or by a choice of the operator, with the prospect of increasing its population and therefore its statistical value.

Since it is a control performed by the grip assembly, the reference to the individual cavity of the mold is maintained up to the inside of the control and inspection device 40, allowing spot control on the individual specific cavity.

The preforms 10 of the predetermined subset 31, once they have been picked up from the elongated element 32 and supported by virtue of their geometry, for example supported under the neck, are conveyed, by virtue of the movement along the movement direction 202, to the control and inspection device 40.

The control and inspection device 40 loads the preforms 10 by means of the conveyor 50, which is configured to maintain their order and/or orientation.

However, nothing forbids the use of systems that might also not guarantee order and/or orientation.

If orientation is not maintained, it is possible to perform in any case a rough inspection of the preforms 10.

Advantageously, the conveyor 50 can for example comprise two oppositely rotating rollers, which maintain the order and orientation of the preforms 10 but not their spacing.

This type of roller conveyor allows to feed the preforms 10 to the control and inspection device 40 without causing defects to said preforms 10. For this reason, the conveyor 50 is adapted to tilt by an angle which can also be fixed, allowing the preforms 10 to form a queue and continue in their flow.

Downstream of the rollers there is an accumulation system with gravity guides, which allows the rollers to return horizontal in the pickup position once the preforms 10 have been unloaded.

Downstream of the buffer there is a timing system which can be used or not as first inspection tracking.

The timing system comprises, for example, a format star conveyor 51 which also acts as first tracking, but it might also be, by way of non-limiting example, a friction feeder or a pair of belts or chains.

The top seal and the bottom of the preform 10 are inspected along the star conveyor 51.

In output from the star conveyor 51, the preform 10 is handled under the sealing and tamper-evident ring or by means of another characteristic geometry by means of a transfer clamp 52 (which is pneumatic or electric). The transfer clamp 52 serves three stations, advantageously transferring two preforms at a time by means of an actuation system constituted by a pneumatic cylinder or by an electric actuator.

The three stations can be for example constituted by a star conveyor extraction device, by a weighing module, which comprises the weight control unit 48, and a second rotation inspection tracking.

The stations may be just two and the weighing module comprising the weight control unit 48 can be positioned downstream of the second tracking.

The weighing module comprising the weight control unit 48 has a plate which supports the preform below the bottle neck (or laid down on the body or below the neck if it is arranged after the second tracking).

Weighing occurs by isolating the weighing module that comprises the weight control unit 48 in a mechanical or electronic manner from the vibrations of the press.

As a consequence of weighing, the preform 10 passes to the second tracking, where it is picked up by vacuum (or by means of a clamp).

A movement axis allows to make the preform 10 translate upward, allowing one or more pyrometers 47 to detect one or more temperature profiles on the external body of the preform 10. One pyrometer 47 might be also positioned within the preform 10 in order to detect an internal profile.

Once translated into the inspection position, the following are controlled, during a rotation permitted by a dedicated rotation axis, on the preform 10:

body defect inspection with video camera;
PET body stress inspection with video camera using polarized light or a grid;
thread parting line and body inspection with a video camera;
thread and neck defect inspection with video camera;
preform color inspection with video camera;
detection of cavity number;
measurements of body and thread with video camera, including thickness.

Detection of the cavity number allows to compare the actual order of arrival of the preforms in the control and inspection device 40 with the arrangement of the matrix of the mold, identifying any preforms lost in transport and thus reporting a possible problem to the automation system.

During rotation, a circumferential temperature profile can be detected by virtue of the pyrometer 47.

At this point, the controls on the preform 10 have been performed and a quality report on the individual preform 10 is recorded and/or released and the preform is released from the vacuum grip onto a belt which reconnects the flow in the extraction belt into an octabin. If it is identified as defective, it can be rejected or it can continue in the flow of the preforms: this distinction is made by means of appropriate separation means, such as for example a trapdoor, pneumatic devices, etc. which are already known in the art.

If the operator wishes to perform further controls on the preforms (for example destructive controls), by means of said separation means, constituted for example by the trapdoor, he can decide to pick up the preform for sampling.

If the control and inspection device 40 detects a certain number of defective preforms that have functional or aesthetic defects, in some conditions it is possible to hypothesize, on the basis of these data, a relatively low overall quality of the preforms contained in a predetermined octabin and consequently report said octabin to assess any subsequent interventions.

The control and inspection device 40 can be configured to control a series of parameters adapted to verify for example a "trend" of the apparatus 1, or of some parts thereof, which can generate a signal to the operator without thereby entailing the rejection of the controlled preforms 10.

For example, if the control and inspection device 40 detects that in the preforms 10 manufactured in a predetermined cavity the temperature or one dimension slowly tend to deviate (while remaining within the conformity range), the inspection and control device 40 might report and recommend a check of said cavity during the subsequent intervention with machine downtime, also with the prospect, therefore, of preventive/predictive maintenance.

The control and inspection device 40 can also be used as a system for the quick sampling of the preforms by means of a dedicated cycle that can be selected in an interface which speeds up extraction and excludes inspection, allowing immediate control by the operator and without contaminations.

The samplings can be also used to check the calibration of the device by means of bench tests. Sampling again occurs by means of the rejection trapdoor, which directs the flow into a box that can be extracted from a window.

The application is particularly useful for process control, since it does not introduce defectiveness on the product. This means that the defects and measurements performed by the control system relate exclusively to the process of the press.

Furthermore, contamination, for example sweat, on the part of the operator does not occur, since everything is automated.

Furthermore, it allows to detect product temperature by means of a pyrometer in a few seconds and in a manner that is repeatable over time, allowing actual control of the exit temperature for each cavity.

The inspection system can also be installed as a retrofit kit, i.e., as an additional device that can be installed on already operational systems.

All the values detected by the system can be attributed to each individual cavity. This allows to feedback this information on the press and to fix possible drifts for each individual cavity.

As an alternative, it is possible to correlate this information with certain parameters and perform or predictive interventions or maintenance, or calculate trends correlated with certain parameters.

The area in which the control and inspection device is located can have isolated access with respect to the molding device.

This allows to have parallel efficiencies between the two machines, and therefore the efficiency of the control and inspection device does not affect the efficiency of press.

It is furthermore possible to act to solve jamming situations or problems of the control and inspection device and on the clamp for extraction from the unloading plate while the molding device is turned on.

The separation between the two areas can occur by means of safety distances which render access safe, by means of a separation with photoelectric barriers or by means of a separation with an actuated partition or other systems that are known in the art.

In practice it has been found that the disclosure achieves the intended aim and advantages.

The disclosure thus conceived is susceptible of numerous modifications and variations, all of which are within the scope of the appended claims; all the details may furthermore be replaced with other technically equivalent elements.

Thus, for example, it is also possible to provide that the unloading plate 20, by means of adjustment devices, can directly pick up a predetermined subset 31 of preforms 10 (for example one or more rows 22a and/or one or more columns 22b) in order to send them to the control and inspection device 40.

In practice, the materials used, so long as they are compatible with the specific use, as well as the contingent shapes and dimensions, may be any according to the requirements and the state of the art.

What is claimed is:

1. An apparatus for the manufacture and unloading of preforms for the manufacture of plastic containers, the apparatus comprising: a device for injection molding of a plurality of preforms and a device for cooling and extraction of the preforms from said molding device, said cooling and extraction device comprising a grip assembly which forms a plurality of cooling receptacles for respective preforms, first transferring means configured for transferring still-warm preforms from said molding device to said grip assembly, said cooling and extraction device comprising an unloading plate which supports a plurality of grip bodies which are arranged in a matrix and can be moved on command in order to engage selectively said grip assembly in order to allow the extraction of the cooled preforms from the respective receptacle and the unloading onto an unloading surface of the preforms, and further comprising a device for selective extraction of a predetermined subset of preforms supported by said unloading plate in an orderly manner along at least one pickup direction, and second transferring means configured for orderly transfer of said predetermined subset of preforms to at least one control and inspection device adapted to perform at least one control on said predetermined subset of preforms.

2. The apparatus according to claim 1, wherein said unloading plate supports a plurality of grip bodies which are arranged in a matrix along a plurality of rows and a plurality of columns which are substantially perpendicular to said plurality of rows, said predetermined subset of preforms supported by said unloading plate corresponding to the preforms supported by at least one row of said grip bodies or to at least one column of said grip bodies.

3. The apparatus according to claim 1, wherein said selective extraction device comprises an elongated body which forms supporting means configured for the preforms to be extracted, said selective extraction device being configured to pick up selectively the supported preforms from different rows of said grip bodies or from different columns of grip bodies.

4. The apparatus according to claim 3, wherein said control and inspection device is functionally associated with movement means configured for moving said elongated body which are adapted to move said elongated body between a pickup position proximate to said unloading plate and facing respectively at least one respective row or a respective column, and a conveyance position substantially at an unloading region arranged proximate to a conveyor adapted to send said preforms in an orderly manner at said control and inspection device.

5. The apparatus according to claim 1, wherein said control and inspection device comprises at least one unit chosen from the group consisting of:
a top seal inspection unit with video camera;
a bottom inspection unit with video camera;
a body defect inspection unit with video camera;
a PET body stress inspection unit with video camera using polarized light or a grid;
a thread parting line inspection unit with video camera;
a thread and bottle neck defect inspection unit with video camera;
a preform color inspection unit with video camera;
a unit for detecting the cavity number;
a unit for the measurement of the body and the thread with video camera, including thickness;
a unit for measuring temperature with a pyrometer; and
a weight control unit.

6. The apparatus according to claim 5, wherein said control and inspection device further comprises at least one unit chosen from the group consisting of:
a unit for measuring thickness with optical sensors;
a unit for color control with a spectrometer;
a unit for 3D reconstruction by tomography; and
a unit for acetaldehyde detection using an olfactory sensor.

7. The apparatus according to claim 1, wherein said conveyor is chosen from the group consisting of:
a belt or chain conveyor;
an air jet conveyor; and
a pair of oppositely rotating rollers.

8. The apparatus according to claim 4, further comprising, downstream of said conveyor, an accumulation system.

9. The apparatus according to claim 8, further comprising, downstream of said accumulation system, a timing system.

10. The apparatus according to claim 1, wherein said control and inspection device comprises a clamp for transfer to three stations, a second station of said three stations comprising a weighing module, which comprises said weight control unit.

11. The apparatus according to claim 5, wherein said at least one pyrometer is associated with a respective movement axis which is adapted to allow a relative movement between said at least one pyrometer and said preform, so as to detect at least one temperature profile of said preform along the axis of extension of said preform.

12. The apparatus according to claim 1, further comprising movement means configured for the movement, about a rotation axis, of said preform with respect to said at least one unit in order to perform inspections during rotation or to detect a temperature profile on the circumference of said preform.

13. The apparatus according to claim 1, wherein an area in which said control and inspection device is arranged has an access which is isolated with respect to the access of said molding device.

* * * * *